(12) United States Patent
Diehl et al.

(10) Patent No.: US 9,700,933 B2
(45) Date of Patent: Jul. 11, 2017

(54) PUNCH RIVET AND METHOD FOR THE ATTACHMENT OF INDIVIDUAL COMPONENTS TO ONE ANOTHER OF WHICH AT LEAST ONE COMPONENT IS FORMED BY A WORKPIECE OF COMPOSITE MATERIAL

(71) Applicant: PROFIL Verbindungstechnik GmbH & Co. KG, Friedrichsdorf (DE)

(72) Inventors: Oliver Diehl, Bad Homburg v.d.H. (DE); Richard Humpert, Bad Nauheim (DE); Andreas Lembach, Darmstadt (DE)

(73) Assignee: PROFIL VERBINDUNGSTECHNIK GMBH & CO. KG, Friedrichsdorf (DE)

( * ) Notice: Subject to any disclaimer, the term of this patent is extended or adjusted under 35 U.S.C. 154(b) by 146 days.

(21) Appl. No.: 14/476,357

(22) Filed: Sep. 3, 2014

(65) Prior Publication Data

US 2015/0059153 A1    Mar. 5, 2015

(30) Foreign Application Priority Data

Sep. 4, 2013  (DE) .................. 10 2013 217 633

(51) Int. Cl.
*B21J 15/02*    (2006.01)
*B21J 15/04*    (2006.01)
(Continued)

(52) U.S. Cl.
CPC ........... *B21J 15/025* (2013.01); *B21J 15/046* (2013.01); *B21J 15/147* (2013.01); *B21J 15/36* (2013.01);
(Continued)

(58) Field of Classification Search
CPC ...... B21J 15/025; B21J 15/046; B21J 15/147; B21J 15/36–15/365; B21J 15/40;
(Continued)

(56) References Cited

U.S. PATENT DOCUMENTS 4,459,073 A    7/1984    Muller
4,543,701 A    10/1985   Muller
(Continued)

FOREIGN PATENT DOCUMENTS

DE    19701088 A1    7/1998
DE    19728736 A1    1/1999
(Continued)

OTHER PUBLICATIONS

Translation of DE102010008554.*

*Primary Examiner* — Christopher Besler
*Assistant Examiner* — Matthew P Travers
(74) *Attorney, Agent, or Firm* — Cantor Colburn LLP

(57) ABSTRACT

A punch rivet for fastening individual components to one another of which at least one component is formed by a workpiece, with the punch rivet having a flange of larger diameter, a rivet section of smaller diameter and a ring-like component contact surface at the side of the flange adjacent the rivet section and surrounding the rivet section, with the rivet section having at its free end a ring surface for the piercing of the two workpieces which stands at least substantially perpendicular to the central longitudinal axis of the punch rivet and an inner concave ring surface which forms the transition from the end of the punch rivet into the hollow internal space of the rivet section. Ribs extending parallel to the longitudinal axis are provided at the generally cylindrical outer surface of the rivet section and extend up to the free end face of the rivet section.

4 Claims, 4 Drawing Sheets

Figure 1A:
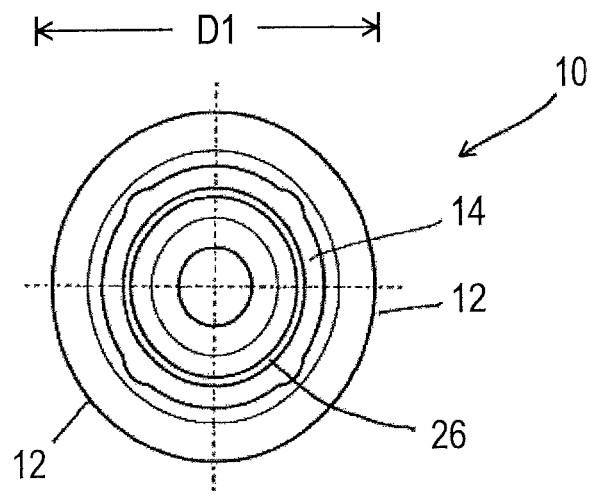

(51) Int. Cl.
  *B21J 15/14* (2006.01)
  *B21J 15/36* (2006.01)
  *F16B 5/04* (2006.01)
  *F16B 19/08* (2006.01)
  *F16B 19/06* (2006.01)
  *B29C 65/00* (2006.01)
  *B29C 65/56* (2006.01)

(52) U.S. Cl.
  CPC ............ *B29C 65/562* (2013.01); *B29C 66/41* (2013.01); *B29C 66/721* (2013.01); *B29C 66/7394* (2013.01); *B29C 66/742* (2013.01); *B29C 66/81431* (2013.01); *B29C 66/8322* (2013.01); *F16B 5/04* (2013.01); *F16B 19/06* (2013.01); *F16B 19/086* (2013.01); *B29C 66/472* (2013.01); *B29C 66/81423* (2013.01); *B29C 66/81425* (2013.01); *B29C 2793/0045* (2013.01); *Y10T 29/49835* (2015.01); *Y10T 29/49957* (2015.01); *Y10T 29/5343* (2015.01)

(58) Field of Classification Search
  CPC ......... B21J 15/48; F16B 15/04; F16B 19/086; Y10T 29/49956; Y10T 29/49957; Y10T 29/49835; Y10T 29/5343; Y10T 29/5377
  See application file for complete search history.

(56) References Cited

U.S. PATENT DOCUMENTS

| | | |
|---|---|---|
| 4,555,838 A | 12/1985 | Muller |
| 4,610,072 A | 9/1986 | Muller |
| 4,727,646 A | 3/1988 | Muller |
| 4,729,163 A * | 3/1988 | Muller .................. B23P 19/062 227/55 |
| 7,160,047 B2 | 1/2007 | Mueller et al. |
| 2013/0000101 A1* | 1/2013 | Rintelmann ............ F16B 19/00 29/525.03 |

FOREIGN PATENT DOCUMENTS

| | | |
|---|---|---|
| DE | 19747267 A1 | 5/1999 |
| DE | 10015239 A1 | 10/2001 |
| DE | 202005015713 U1 | 12/2005 |
| DE | 102005052360 A1 | 5/2007 |
| DE | 102006007708 A1 | 8/2007 |
| DE | 102007044635 A1 | 4/2009 |
| DE | 102009035338 A1 | 1/2011 |
| DE | 102009048398 A1 | 4/2011 |
| DE | 102010008554 A1 | 8/2011 |
| DE | 102010009026 A1 | 8/2011 |
| DE | 102012003972 A1 | 8/2013 |
| EP | 0351715 A2 | 1/1990 |
| EP | 0539739 A2 | 5/1993 |
| EP | 0691900 | 10/1994 |
| EP | 0890397 A1 | 1/1999 |
| EP | 1381785 B1 | 1/2004 |
| EP | 1430229 A1 | 6/2004 |
| EP | 1497073 A1 | 1/2005 |
| GB | 1581825 | 12/1980 |
| JP | 2002093489 A | 3/2002 |
| JP | 2005069451 A | 3/2005 |
| WO | 0016928 A1 | 3/2000 |

* cited by examiner

PUNCH RIVET AND METHOD FOR THE ATTACHMENT OF INDIVIDUAL COMPONENTS TO ONE ANOTHER OF WHICH AT LEAST ONE COMPONENT IS FORMED BY A WORKPIECE OF COMPOSITE MATERIAL

The present invention relates to a punch rivet and also to a method for the attachment of individual components to one another using a punch rivet of which at least one component is formed by a workpiece of composite material.

Punch rivets are known, they are usually used in order to secure two components in the form of sheet metal parts to one another. For this purpose, a punch rivet has a flange of larger diameter, a rivet section of smaller diameter and a ring-like component contact surface at the side of the flange adjacent the rivet section and surrounding the rivet section. This surface is frequently a conical surface and is pressed during the pressing of the punch rivet into the two components into the surface of the upper sheet metal part, with the side of the flange remote from the rivet section being flush with the upper side of the upper sheet metal part.

The free end of the rivet section is formed by a conical surface which converges inwardly and in the direction of the flange. This leads to the rivet section being spread in trumpet-like manner during the pressing in of the punch rivet as a result of the forces acting on the conical surface and to the rivet section not piercing the second component. The components are held together as a result of the wedge action of the trumpet-like shape of the rivet section, which is filled with material of the components.

The object of the present invention is to provide a novel punch rivet which is suitable for the connection of at least two panel-like components to one another of which at least one component consists of a fiber or fabric reinforced plastic, with a high quality rivet joint being achievable which ensures a high strength connection of the components to one another without a pronounced danger existing that the punch rivets that are used can be torn out of one component or a plurality of components or that undesired fatigue effects occur in the course of time.

Frequently one is concerned with joining two or three components (or eventually even more components) to one another, with at least one component consisting of the said fiber or fabric reinforced plastic. It can for example consist of a component of such a composite material and a component of metal, or of two components of such a composite material, or of two components of a composite material of this kind and a component of metal, or of three components of the said composite material.

Hitherto only a few proposals have been made for the mechanical joining of components of the named composite material. Most of these are concerned with the embedding of fastening elements or reinforcement plates into individual components which can be secured together with customary fastening elements. This is, however, relatively complicated and expensive and disturbs the process sequence in the manufacture of the individual components.

U.S. Pat. No. 7,160,047 describes the attachment of fastener elements in the form of bolt elements or nut elements to a component. which consists of a composite material which is defined there as a brittle or resilient component which consists for example of a material having a hollow spaces or pores, such as for example plastics, wood, metal foams, metals which are filled with hollow bodies or plastics or another relatively soft material and which are optionally present in the form of a sandwich construction or as a composite material, for example in the form of a single ply or multi-ply structure with for example two sheet metal or plastic layers with a core of one of the above-named substances or materials.

The present invention is concerned in contrast with workpieces which consists of a fiber or fabric reinforced plastic and in particular those with a duroplastic matrix material, with the invention have also being suitable for use with workpieces in the form of sheet metal parts. In contrast to the materials defined in U.S. Pat. No. 7,160,047 the present workpieces are relatively hard and thin so that other considerations have to be made for the processing of the materials in the sense of attachment of fastener elements.

With regard to the definition of composite materials which can be used in the context of the present invention the following is explained:

Under the designation fiber or fabric reinforced plastic one understands composite materials with high strength fibers such as for example aramid fibers, carbon fibers or glass fibers which are either present as relatively short filling fibers or as long filaments, or in the form of a fabric manufactured from filaments, and embedded in the matrix material of plastic. Thermoplastic materials can admittedly be used as the plastic; however, duroplastic plastics are normally used for coachwork components. The corresponding components are generally present in panel form, as a rule with a three-dimensional shape.

In order to satisfy the above named object there is provided, in accordance with the invention, a punch rivet of the initially named kind, wherein the rivet section has at its free end a ring surface for the piercing of the two workpieces which stands at least substantially perpendicular to the central longitudinal axis of the punch rivet and preferably has an inner concave ring surface which forms the transition from the end face of the punch rivet into the hollow internal space of the rivet. In this design the radial extent of the concave ring surface is smaller than that of the ring surface which stands at least substantially perpendicular to the central longitudinal axis.

With a design of this kind one endeavors, in contrast to customary punch rivets, to fully pierce the components which lie on one another, so that a high quality rivet bead can be generated at the side of the lower component remote from the flange. For this purpose the punch rivet of the invention must be significantly longer than the total thickness of the stack of the components lying on one another, in contrast to punch rivets which do not fully penetrate the stack.

Furthermore the invention relates to the recognition that components of a fibre or fabric reinforced plastic, in particular one with a duroplastic matrix material tends to crumble under the forces acting at the free end of the piercing section, which is exploited here in the sense that the handling of the piercing slug which arises is facilitated because it has a transverse dimension which correspond approximately to the inner diameter of the rivet section.

It is particularly favorable when the punch rivet has ribs extending parallel to the longitudinal axis at the generally right cylindrical outer surface of the rivet section, which preferably extend up to the free end of the rivet section.

Through the shifting of the material of the ribs along the remaining, generally tubular rivet section (tubular apart from the longitudinal ribs) material accumulations can be formed which clamp the components to one another and indeed between the flange of the punch rivet and the material accumulations. The remaining free end of the tubular rivet section can then, if required, be shaped into a rivet bead, as will be explained later in more detail.

A design of this kind makes it possible to first attach the punch rivet to one component or to two components in the sense of the manufacture of an intermediate product, and this intermediate product can then be taken to a different manufacturing location in the same factory or elsewhere and riveted to one or more further components. The intermediate product can however itself be a finished produce.

The punch rivet can be closed by a wall in the region of the flange or it can have a central passage which extends over the whole length of the hollow rivet.

The method of the invention is concerned with the joining of individual components to each other using a punch rivet, with at least one of the components being formed by a workpiece of composite material. In this connection the punch rivet has a flange of larger diameter, a rivet section of smaller diameter and a ring-like component contact surface at the side of the flange adjacent the rivet section and surrounding the rivet section. The rivet section is designed at its free end for the piercing of the two work-pieces and ribs extending parallel to the longitudinal axis are provided at the generally right cylindrical outer surface of the rivet section and preferably extend up to the free end of the rivet section, with the method including the following steps:
a) arrangement of the die button against one of the components which are to be secured to one another and which are placed on one another, with the die button having a bore which is dimensioned to receive the rivet section but not however the ribs,
b) carrying out a relative movement of the punch rivet with the free end of the rivet section to the fore against the components arranged on one another and in the direction of the die button,
c) piercing of the components with the free end of the rivet section and introduction of the rivet section into the bore of the die button with simultaneous shaving of the material of the ribs until the component contact surface comes into contact with the component adjacent the flange and the shaved material forms material accumulations which clamp the components between the flange and themselves.

In this way the above mentioned intermediate product is manufactured, which can however also be an end product. In order to make such an intermediate product into a finished product the end region of the rivet section remote from the flange and projecting out of the components can be made into a rivet bead by using a second die button which has a central post and a concavely rounded ring surface surrounding the central post, and indeed without the addition of a further component or with the addition of a further pre-holed component. In both cases the formation of a rivet bead in addition to the material accumulations leads to an excellent clamped connection of the components placed against one another and indeed between the flange on the one side of the stack of components and the material accumulations and the rivet bead on the other side.

The method can take place in such a way that the piercing slugs which have arisen in the steps b) and c) (from the plural components) are disposed of through the preferably diverging bore of the first die button.

As an alternative to this the strength of the connection can be increased when a central part of the first die button formed as a displaceable plunger is moved into the hollow rivet section and the piercing slugs are pressed into the tubular hollow space of the punch rivet. This process is particularly favorable with punch rivets which are closed in the region of the flange by a transverse wall. Then the piercing slugs can be brought into contact with the closed wall which substantially stiffens the connection.

Figure 1B:
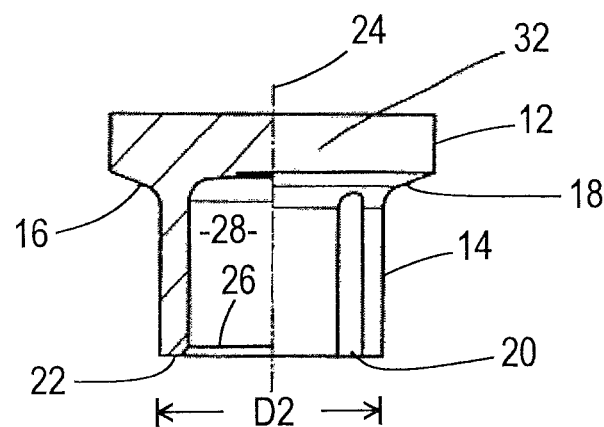
Figure 1C:
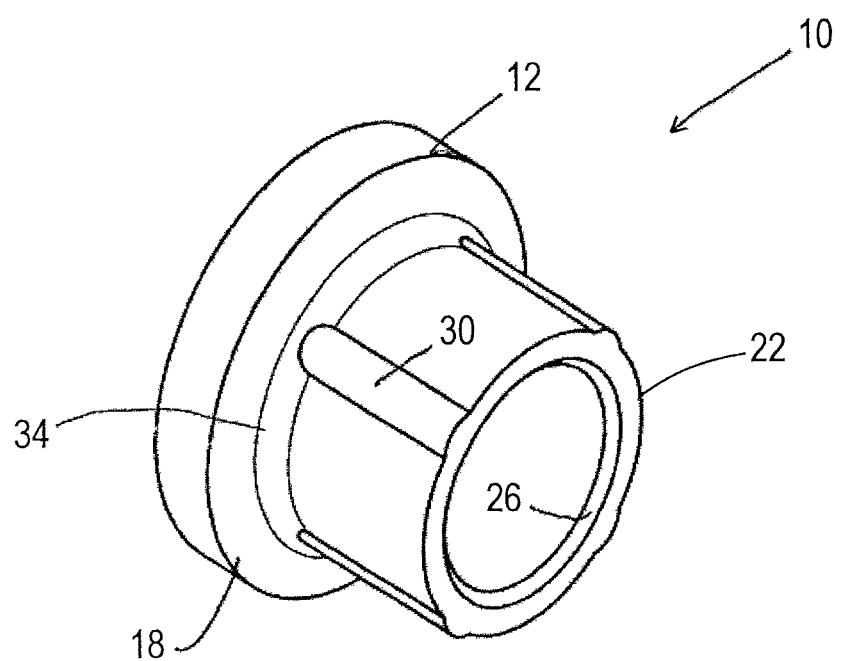
Figure 2A:
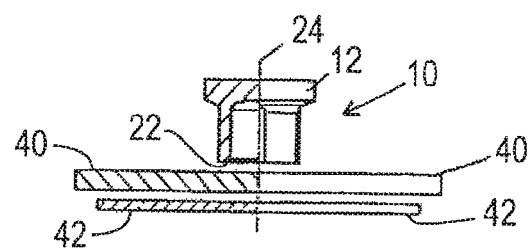
Figure 2B:
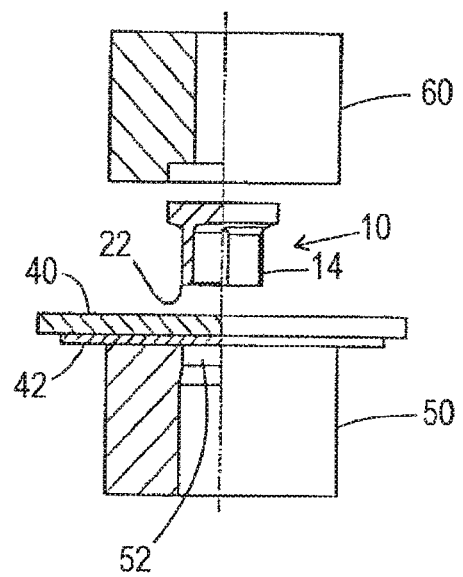
Figure 2C:
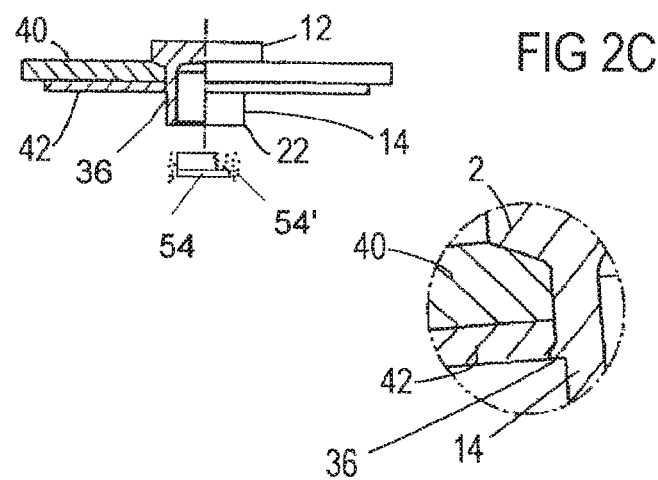
Figure 3A:
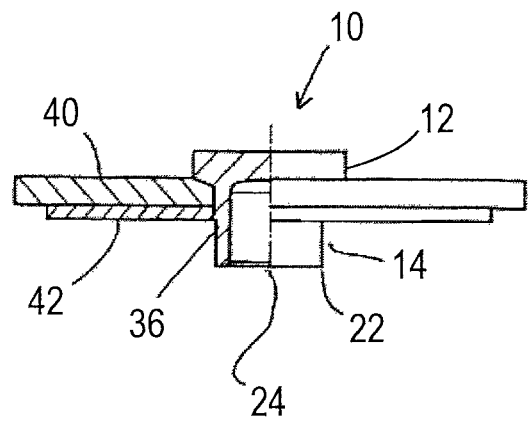
Figure 3B:
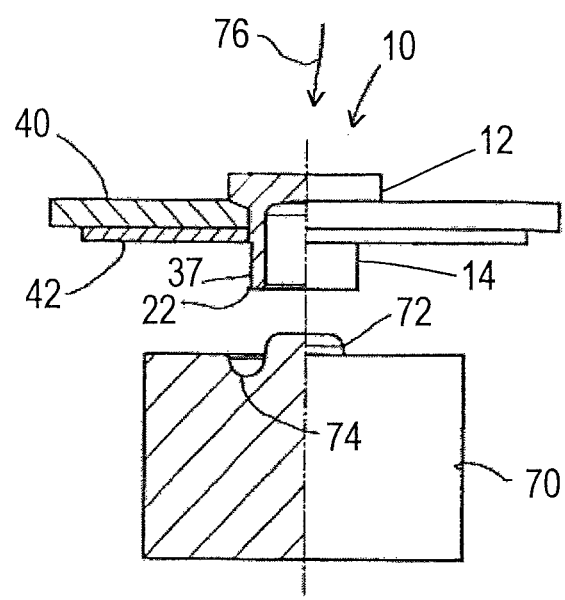
Figure 3C:
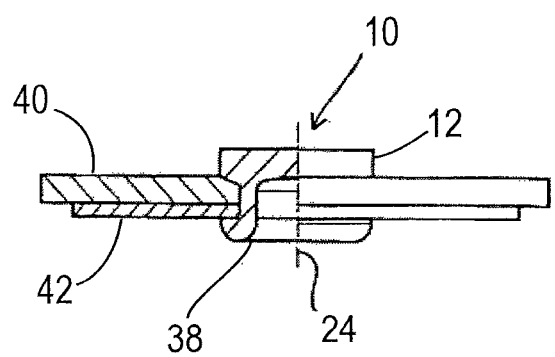

Further developments of the invention will now be described in more detail with reference to practical embodiments and to the drawings in which are shown:

FIGS. 1A to 1C a punch rivet in accordance with the invention and indeed in an end view (FIG. 1A) onto the rivet section of the punch rivet, in a partly sectioned side view (FIG. 1B) and in a perspective representation (FIG. 1C), FIGS. 2A to 2C representations of three phases of the attachment of a punch rivet in accordance with FIGS. 1A to 1C to two components to be secured to one another, with the FIG. 2A showing the starting position, FIG. 2B the processing of the elements in accordance with FIG. 2A and FIG. 2C the resulting first product, and FIGS. 3A to 3C representations of further phases of the processing of the first product of FIG. 2C, here shown again as FIG. 3A, by means of the apparatus of FIG. 3B in order to generate a finished product in accordance with FIG. 3C.

Referring now to the FIGS. 1A to 1C a punch rivet 10 is shown there for the attachment of individual components 40, 42 to one another (FIG. 2A) of which at least one component 40 is formed by a workpiece of composite material.

The punch rivet 10 has a flange 12 of larger diameter D1, a rivet section 14 of smaller diameter D2 and a ring-like component contact surface 18 at the side 16 of the flange adjacent to the rivet section 14 and surrounding the rivet section 14. The rivet section 14 has at its free end 20 a ring surface 22 for the piercing of the two components 40, 42 that stands at least substantially perpendicular to the central longitudinal axis 24 of the punch rivet 10 and has an inner concave ring surface 26 which forms the transition from the end face 22 of the punch rivet 10 into the hollow internal space 28 of the rivet section. This concave ring surface 26 is not essential and it is also not essential for the ring surface 22 to stand strictly perpendicular to the central longitudinal axis 24, it could form an enclosed angle of 80 to 100° C. with the longitudinal axis and could also be rounded.

The component contact surface 18 is shown here as a conical surface, this is however also not essential, this surface could also stand perpendicular to the longitudinal axis. The area of the component contact surface is defined by the diameter of the flange and this should be selected sufficiently large in that the surface pressure is designed for the material having regard to the properties of the first component and the forces which originate in operation from the punch rivet or are transmitted by the punch rivet. The rivet section has a right cylindrical hollow internal space 28 and a right cylindrical jacket surface apart from the rounded longitudinal ribs 30. The ribs 30 extend here over the entire length of the rivet section, preferably up to the free end 20 of the rivet section 14. The length of the rivet section exceeds the total thickness of the components which are to be secured to one another by an amount which permits the formation of a rivet bead.

In this example, the punch rivet 10 is bounded in the region of the flange by a wall 32. This wall 32 bounds the hollow inner space 28 and is slightly arched as is evident from FIG. 1B.

It should be entirely possible to omit wall 32 and to form the punch rivet 10 as a hollow punch rivet, that is to say, such that the central passage corresponding to the hollow internal space 28 extends over the full length of the hollow rivet.

The reference numeral 34 points to a fillet which forms the transition from the rivet section 14 into the sheet metal contact surface 18 and in has approximately the radial thickness of the ribs 30.

The method for the attachment of individual components 40, 42 to one another using a punch rivet in order to form a first product will now be described with reference to FIGS. 2A to 2C. In this example at least the upper component 40 is formed by a workpiece of composite material.

In FIG. 2A the punch rivet 10 is arranged with its flange of larger diameter D1 at the top and its rivet section of smaller diameter D2 at the bottom of the upper component 40. In this connection the component contact surface 18 of the flange adjacent the rivet section surrounds the rivet section opposite the component 40. The free end face 20 of the rivet section 14 which is designed to pierce the two workpieces 40, 42 lies directly above the upper component 40 and the ribs 39 which extend parallel to the longitudinal axis at the right cylindrical outer surface of the rivet section 14 stands perpendicular to the upper component 40.

The method of manufacturing a first product in accordance with FIG. 2C includes the following steps:

a) arrangement of the die button against one 42 of the components 40, 42 which are to be secured to one another and which are placed on one another, with the die button having a bore 52 which is dimensioned to receive the rivet section 14 but not however the ribs 30, b) carrying out a relative movement of the punch rivet 10 with the free end 22 of the rivet section to the fore against the components 40, 42 arranged on one another and in the direction of the die button 50, c) piercing of the components 40, 42 with the free end 22 of the rivet section 14 and introduction of the rivet section into the bore 52 of the die button with simultaneous shaving of the material of the ribs 30 until the component contact surface 18 comes into contact with the component 40 adjacent the flange 12 and the shaved material forms material accumulations 36 which clamp the components 40, 42 between the flange 12 and themselves.

For the attachment of the punch rivet 10 it is normally introduced into a setting or piercing head which delivers such punch rivets or fastener elements one after the other to a sequence of workpieces 40, 42. In this connection a spring-loaded hold down member (likewise not shown but also well-known per se) is normally used which surrounds the punch rivet or the fastener element and which serves to press the workpiece, here the components 40, 42 against the end face of the die button 50 so that the workpiece 40, 42 can be held in its intended position. The punch rivet 10 or the fastener element 10 is normally moved in the direction towards the workpiece by means of a plunger (likewise not shown) of the setting head 60 in the direction towards the workpiece 40, 42.

As explained above the die button 50, is located beneath the workpieces 40, 42 and normally has a cylindrical shape which is let into a corresponding bore (not shown) of a tool (likewise not shown).

As usual for the attachment of fastener elements, this discussion relates to a piercing head which is arranged at the upper tool of a press or at an intermediate platen of the press, whereas the tool which receives the die button 50 is the intermediate platen of the press or the lower tool of the press respectively. An inverted arrangement would also be possible in which the setting head is arranged at the lower tool of the press or at an intermediate platen of the press, whereas the die button 50 is then located at the intermediate platen or at the upper tool of the press respectively.

It is in no way essential to use a press for the attachment of the punch rivet to the workpiece. By way of example a robot, for example in accordance with the European patent 0 691 900 could be used, with the die button 50 and the setting head then being carried by the robot. However, a percussion tool or another tool could also be used for the attachment of the functional element arrangement to the component, for example a tool in accordance with one of the following protective rights DE-PS 197 47 267, EP 0 890 397 or DE-PS 197 01 088.

It is indeed generally customary to attach fastener elements 10 to a workpiece with the central longitudinal axis 17 arranged vertically. However, an orientation of this kind is in no way essential. Instead of this the longitudinal axis 17 could have any desired orientation in space. Accordingly, when geometrical terms such as vertical or top or bottom or above and below are used in this application, then this is to be understood in such a way that the designations simply relate to the orientation of the corresponding figure and should in no way be restrictively construed.

The result of the manufacturing process in accordance to FIGS. 2A to 2C, i.e. the first product can be seen in FIG. 2C. The first product can already be the finished product or it can be further processed as shown in FIGS. 3A to 3C, with the FIG. 3A being identical to FIG. 2C in order to show that the first product in accordance with FIG. 2C forms the starting product or the further process.

In FIG. 3B the further die button 70 is then used. This die button 70 is provided with a central post 72 and a concavely rounded ring surface 74 surrounding the central post 72. The component assembly in the form of a first product is moved towards the die button 70 by means of a force which acts in the arrow direction 76 and is, for example, exerted by means of a plunger (not shown) in a press (likewise not shown) on the upper side of the flange 12. The die button 70 is, as described above, held in a lower tool of the press or in an intermediate platen of the press. The end 37 of the rivet section 14 projecting out of the components 40, 42 remote from the flange 12 is increasingly pressed downwardly in FIG. 3B on increasing movement of the component assembly and increasing closure of the non-illustrated press. In this way, the free end 22 of the rivet section 14 is forced to move along the central post 72 and subsequently along the concavely rounded ring surfaces 74 and radially outwardly, whereby the free end 37 of the rivet section is beaded over into a rivet bead 38.

The central post 72 centers the free end 22 of the rivet section in that it slides into the free end 37 and the slightly conically downwardly diverging form of the central post 72 initiates the radially outwardly directed movement of the free end 22 of the rivet section 14.

The finished product can now be find in FIG. 3C. Instead of effecting the relative movement necessary for this reshaping in the press it can also be brought about by means of a robot or by force-actuated tongues or otherwise.

Depending on the purpose the components in the form of a finished product in accordance with FIG. 3C are intended to satisfy the manufacture in two passes in accordance with FIGS. 2A to 2C, on the one hand, and FIGS. 3A to 3C, on the other hand, can also take place in different stages of one plant, for example in a progressive tool. If smaller sheet metal parts are to be attached to composite components, above all when a plurality of operations are to be carried out and can be realized in a press, or the first product is to be manufactured in one plant and the final product in a second plant of the same factory, then the two plants can be part of a transfer system or the two plants can be located at different locations in the same factory or in different factories or in different areas of the same production hall.

Furthermore, the possibility exists of placing a further pre-holed component (not shown) in the second manufacturing stage in accordance with FIGS. 3A to 3C . . . the projecting rivet section against the underside of the second component 42 and this further component (which can also consist of plural components) can then be fixed to the two first named components 40 and 42 by the subsequently formed rivet bead 38.

The method just explained above can also take place in such way that the piercing slugs 54 which arise are removed as indicated through the preferably diverging bore 52 of the first die button 50. The piercing slugs 54 (one slug is produced for each layer of material) and the crumbled material 54' around them which arise when components of a fibre or fabric reinforced plastic, in particular one with a duroplastic matrix material which tends to crumble under the forces acting at the free end of the piercing section are illustrated at the bottom of FIG. 2C. As an alternative to the situation just described, when the punch rivet 10 is a punch rivet having a closed transverse wall 32, a center part of the first die button 50 which is formed as a displacement plunger, which is movably arranged for axial movements in the bore 52, can be used in order to press the piercing slugs 54 into the hollow rivet section 14 and they can be brought into contact with the inner side of the transverse wall 32.

In all embodiments materials can be named as an example from the material of the punch rivets which, in the context of cold deformation, achieve the strength values of class 8 in accordance with the ISO standard or higher, for example a 35B2 alloy in accordance with DIN 1654. Also aluminum alloys, in particular those of higher strength can be used for the punch rivets, for example AlMg5. Fastener elements of higher strength magnesium alloys, such as for example AM50, can also be considered.

REFERENCE NUMERAL LIST 10 punch rivet
12 flange
14 rivet section
15 rivet bead
16 side of the flange adjacent the rivet section
18 component contact surface
20 end
22 ring surface
24 longitudinal axis
26 concave ring surface
28 hollow inner space of the rivet section
30 longitudinal ribs
32 transverse wall
34 fillet
36 material accumulations
37 free end of the rivet section
38 rivet bead
40 upper component
42 lower component
50 die button
52 bore
54 piercing slug
60 piercing head
70 die button
72 central post
74 concavely rounded semi-toroidal ring surface
76 arrow direction

The invention claimed is:

1. A method of attaching individual components (40, 42) to one another using a punching rivet (10) wherein at least one of the components (40) is formed by a workpiece of composite material, with the punch rivet having a flange (12) of larger diameter (D1), a rivet section (14) of smaller diameter (D2) and a ring-like component contact surface (18) at the side (16) of the flange adjacent the rivet section and surrounding the rivet section, with the rivet section (14) being designed at its free end (22) for the piercing of the two workpieces and ribs (30) extending parallel to the longitudinal axis are provided at the generally right cylindrical outer surface of the rivet section (14), all of the ribs extending completely to the free end (22) of the rivet section, with the method including the following steps:
   a) arrangement of a first die button against one (42) of the components (40, 42) which are to be secured to one another and which are placed on one another, with the first die button having a bore (52) which is dimensioned to receive the rivet section (14) but not however the ribs (30),
   b) carrying out a relative movement of the punch rivet (10) with the free end (22) of the rivet section to the fore against the components (40, 42) arranged on one another and in the direction of the first die button (50),
   c) piercing of the components (40, 42) with the free end (22) of the rivet section (14) and introduction of the rivet section into the bore (52) of the first die button with simultaneous shaving of the material of the ribs (30) until the component contact surface (18) comes into contact with the component (40) adjacent the flange (12) and the shaved material forms material accumulations (36) which clamp the components (40, 42) between the flange (12) and the material accumulations.

2. A method in accordance with claim 1, with further method step
   d) that by using a second die button (70) with a central post (72) and a concavely rounded ring surface (74) surrounding the central post, the end (37) of the rivet section (14) remote from the flange (12) projecting out of the components is beaded over to form a rivet bead (38).

3. A method in accordance with claim 2, wherein a further pre-pierced component is positioned onto the end (37) of the rivet section (14) remote from the flange (12) and projecting out of the components before the end of the rivet section is beaded over to form a rivet bead (38).

4. A method in accordance with claim 1, wherein the piercing slugs (54) which arise in the steps b) and c) are either disposed of through the diverging bore (52) of the first die button (50) or are moved by a central part of the first die button formed as a displaceable plunger into the hollow rivet section (14).

* * * * *